United States Patent
Jamison

(10) Patent No.: US 7,108,066 B2
(45) Date of Patent: Sep. 19, 2006

(54) VARIABLE DENSITY TREATMENT FLUIDS AND METHODS OF USING SUCH FLUIDS IN SUBTERRANEAN FORMATIONS

(75) Inventor: Dale E. Jamison, Humble, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 79 days.

(21) Appl. No.: 10/765,510

(22) Filed: Jan. 27, 2004

(65) Prior Publication Data

US 2005/0161262 A1 Jul. 28, 2005

(51) Int. Cl.
*E21B 43/22* (2006.01)
*E21B 21/00* (2006.01)
*E21B 43/25* (2006.01)

(52) U.S. Cl. ............... 166/305.1; 166/307; 166/308.2; 166/308.3; 166/308.4; 175/65; 175/69; 175/72; 507/102; 507/117; 507/140; 507/202; 507/219; 507/270; 507/925

(58) Field of Classification Search ............ 166/305.1, 166/307, 308.2, 308.3, 308.4; 175/65, 69, 175/72; 507/102, 117, 140, 202, 219, 270, 507/925
See application file for complete search history.

(56) References Cited

U.S. PATENT DOCUMENTS

| | | | |
|---|---|---|---|
| 4,063,603 A | 12/1977 | Rayborn ................... 175/65 |
| 4,234,344 A | 11/1980 | Tinsley et al. ............. 106/88 |
| 4,304,298 A | 12/1981 | Sutton ...................... 166/293 |
| 4,340,427 A | 7/1982 | Sutton ...................... 106/87 |
| 4,367,093 A | 1/1983 | Burkhalter et al. ........ 106/87 |
| 4,370,166 A | 1/1983 | Powers et al. ............. 106/97 |
| 4,450,009 A | 5/1984 | Childs et al. .............. 106/76 |
| 4,450,010 A | 5/1984 | Burkhalter et al. ........ 106/87 |
| 4,460,052 A | 7/1984 | Gockel ..................... 175/72 |
| 4,498,995 A | 2/1985 | Gockel ................. 252/8.5 LC |
| 4,565,578 A | 1/1986 | Sutton et al. ............... 106/87 |
| 4,676,317 A | 6/1987 | Fry et al. ................... 166/293 |
| 4,700,780 A | 10/1987 | Brothers ................... 166/293 |
| 4,703,801 A | 11/1987 | Fry et al. ................... 166/293 |
| 4,806,164 A | 2/1989 | Brothers ................... 106/90 |
| 5,124,186 A | 6/1992 | Wycech ................... 428/35.8 |
| 5,837,739 A | 11/1998 | Nowak et al. ............. 521/54 |
| 6,279,652 B1 | 8/2001 | Chatterji et al. .......... 166/194 |
| 6,330,916 B1 * | 12/2001 | Rickards et al. ......... 166/280.2 |
| 6,367,549 B1 | 4/2002 | Chatterji et al. .......... 166/292 |
| 6,398,866 B1 | 6/2002 | Wombacher et al. ..... 106/823 |
| 6,457,524 B1 | 10/2002 | Roddy ...................... 166/293 |
| 6,508,305 B1 | 1/2003 | Brannon et al. ........... 166/293 |
| 6,518,224 B1 | 2/2003 | Wood ........................ 507/17 |

(Continued)

FOREIGN PATENT DOCUMENTS

VE 52882 2/1992

(Continued)

OTHER PUBLICATIONS

3M Specialty Materials brochure entitled "3M™ Microspheres" dated Sep. 2000.

(Continued)

*Primary Examiner*—George Suchfield
(74) *Attorney, Agent, or Firm*—Craig W. Roddy; Baker Botts L.L.P.

(57) ABSTRACT

The present invention provides variable density fluid compositions and methods for using such compositions in a subterranean formation. One exemplary embodiment of the variable density fluid compositions of the present invention comprises a variable density fluid comprising: a base fluid, and a portion of variable pressure weighting material particles.

25 Claims, 9 Drawing Sheets

Increasing Density

U.S. PATENT DOCUMENTS

| | | | |
|---|---|---|---|
| 6,530,437 B1 | 3/2003 | Maurer et al. | 175/5 |
| 6,645,288 B1 | 11/2003 | Dargaud et al. | 106/696 |
| 7,004,255 B1 * | 2/2006 | Boney | 166/280.2 |
| 7,037,881 B1 * | 5/2006 | Growcock et al. | 507/102 |
| 7,049,272 B1 * | 5/2006 | Sinclair et al. | 507/230 |
| 2002/0108782 A1 | 8/2002 | De Boer | 175/7 |
| 2002/0108786 A1 | 8/2002 | Rowder | 175/57 |
| 2005/0284641 A1 | 12/2005 | Watkins et al. | |

FOREIGN PATENT DOCUMENTS

| | | |
|---|---|---|
| VE | 52883 | 2/1992 |
| VE | 53935 | 8/1992 |
| VE | 53936 | 8/1992 |

OTHER PUBLICATIONS

3M Specialty Materials brochure entitled "3M Scotchilte™ Glass Bubbles" Dated Jul. 1999.

AKZO Nobel brochure entitled "Expancel".

3M Specialty Materials brochure entitled "Specialty Materials For the Oil & Gas Industry" dated Jun. 2001.

Halliburton brochure entitled "Spherelite Cement Additive" dated 1999.

* cited by examiner (a)    (b)    (c)

VARIABLE DENSITY TREATMENT FLUIDS AND METHODS OF USING SUCH FLUIDS IN SUBTERRANEAN FORMATIONS

BACKGROUND OF THE INVENTION

The present invention relates to subterranean treatment fluids. In particular, the present invention relates to variable density subterranean treatment fluids comprising variable density weighting materials and methods for preparing and for using such variable density subterranean treatment fluids.

A treatment fluid may be used in a subterranean formation in a variety of ways. For example, a fluid may be used to drill a bore hole in a subterranean formation, to stimulate a well bore in a subterranean formation, to clean up a well bore in a subterranean formation, as well as for numerous other purposes. The process of drilling a well typically requires the use of a drilling fluid. During the drilling process, the drilling fluid passes down through the inside of the drill string, exits through the drill bit and returns to the drilling rig through the annulus between the drill string and well bore. The circulating drilling fluid lubricates the drill bit, carries drill cuttings to the surface, and balances the formation pressure exerted on the well bore. Additionally, a properly prepared drilling fluid enhances well drilling safety by preventing "kicks." A kick is an uncontrolled flow of formation fluid into the well bore from the subterranean formation typically resulting from drilling into a zone of higher than expected or unanticipated pressure. Kicks are both dangerous and very costly to drillers. Thus, drilling operators inherently wish to avoid or minimize kicks, or at least detect kicks as early as possible.

Drilling offshore in deep waters requires specially blended drilling fluids that must be carefully formulated to account for the narrow range of pressure separating the pore pressure from the fracture gradient of the formation. As used herein, the term "pore pressure" refers to the pressure exerted on the borehole by fluids within the formation, while the term "fracture gradient" refers to that pressure which will fracture the formation. Fracturing the formation may result in, inter alia, flow of drilling fluids out of the bore hole into the formation, or possibly an uncontrolled blowout of the formation. Accordingly, the weight of the drilling fluid must be sufficient to balance the pore pressure (and thus provide the necessary protection against kicks) without inadvertently fracturing the sediment and rock around the drill bit.

The formulation of a drilling fluid satisfying these limitations is often complicated because the riser connecting the borehole to the drilling rig must often be quite long, particularly when drilling in deep water applications. As used herein, the term "riser" refers to a length of piping connecting the borehole to the drill ship or drilling rig, through which the drilling fluid is returned to the surface. The length of the riser column could be long, and thus the pressure exerted due to friction and hydrostatic forces could be considerable, even when at relatively shallow depths within the subterranean formation and even when using low density drilling fluids. Further complicating the formulation of the drilling fluid, at subsequent depths the hydrostatic and friction forces may be insufficient to prevent fluid influx from the formation.

Efforts to overcome this difficulty in drilling deep water wells have met with limited success. One proposed solution involves the installation of multiple strings of casing within the borehole to guard against inadvertent fracturing during the drilling process. This strategy is problematic because the installation of additional casing correspondingly reduces the usable diameter of the borehole. Furthermore, the installation of additional strings of casing may add greatly to the expense and complication of completing the well. Another option requires placement of pumps on the ocean floor, wherein drilling fluid exiting the well bore is diverted from the drilling riser annulus into the pumps. Subsequently, the pumps return the drilling fluid to the drill ship through the riser. Accordingly, in this method, the pumps remove the weight of the returning drilling fluid from the well bore. However, this method does not achieve desirable results because of the great expense involved in procuring and installing the system of pumps. Another proposed option has been to reduce the density of the drilling fluid as it exits the well bore by injecting hollow spheres into the drilling fluid to reduce the density of the drilling fluid. However, this method is problematic because of the cost and mechanical difficulty of injecting these spheres at the sea floor, and then separating them from the drilling fluid at the surface.

Analogous problems exist in other subterranean operations. For example, a fracturing or acidizing operation may involve additional expense in removing the spent fracturing or acidizing fluid from the well bore after the operation is conducted, due in part to the fixed-density nature of such fluids, which may necessitate additional manpower or pumping equipment to remove such fluid in a timely fashion.

SUMMARY OF THE INVENTION

The present invention relates to subterranean treatment fluids. In particular, the present invention relates to variable density subterranean treatment fluids comprising variable density weighting materials and methods for preparing and for using such variable density subterranean treatment fluids.

An example of a method of the present invention is a method of using a treatment fluid in a subterranean formation comprising introducing a treatment fluid having a density that varies as a function of pressure into a subterranean formation, wherein the treatment fluid comprises a base fluid and a portion of variable pressure weighting material particles.

Another example of a method of the present invention is a method of preparing a variable pressure weighting material particle comprising the step of pressurizing and sealing a hollow rod or tube formed from an elastically deformable material.

Another example of a method of the present invention is a method of preparing a variable pressure weighting material particle comprising the step of pressurizing and sealing an assembly of multiple sheets of elastically deformable material together.

An example of a composition of the present invention is a variable density treatment fluid comprising: a base fluid; and a portion of variable pressure weighting material particles.

Another example of a composition of the present invention is a variable pressure weighting material particle comprising a hollow, elastically deformable particle.

The features, benefits and advantages of the present invention will be readily apparent to those skilled in the art upon a reading of the description of the exemplary embodiments, which follows.

DESCRIPTION OF EXEMPLARY EMBODIMENTS

Figure 1:
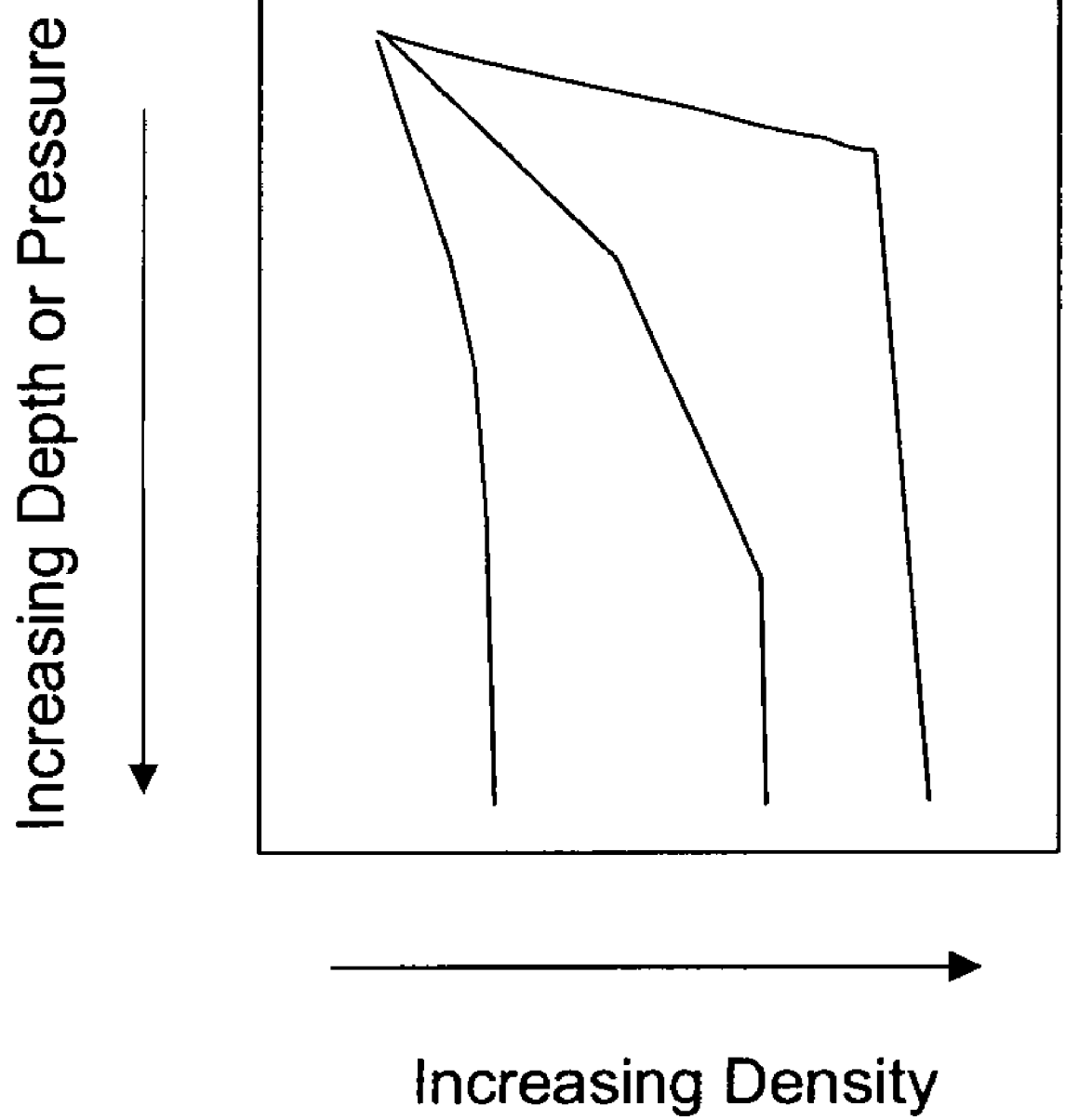
FIG. 1 is a graphical representation of exemplary pressure-density curves for certain embodiments of VPWM particles

The present invention relates to subterranean treatment fluids. In particular, the present invention relates to variable density subterranean treatment fluids comprising variable pressure weighting ("VPWM") particles and methods for preparing and for using such variable density subterranean treatment fluids. The VPWM particles have the capability of varying in density with external pressure; as the VPWM particles encounter higher downhole pressures, they compress, thereby reducing their volume and increasing their density, as illustrated in FIG. 1, which depicts exemplary pressure-density curves for certain embodiments of VPWM particles.

The treatment fluids of the present invention may vary in density at particular phases of a subterranean operation (e.g., drilling, fracturing, or the like) as may be necessary to adapt to the subterranean conditions to which the fluid will be subjected. For example, where the treatment fluids of the present invention are utilized in offshore drilling applications, the treatment fluid may have a lower density when located above the ocean floor, and subsequently have a higher density when located within the well bore beneath the ocean floor. Generally, the treatment fluids of the present invention will have a density in the range of from about 6 lb/gallon to about 18 lb/gallon when measured at sea level. When utilized in offshore applications, the treatment fluids have a density in the range of from about 8 lb/gallon to about 20 lb/gallon, measured when at a point of maximum compression.

The treatment fluids of the present invention generally comprise a base fluid, and a portion of VPWM particles. Other additives suitable for use in subterranean operations also may be added to these compositions if desired.

The base fluid utilized in the treatment fluids of the present invention may be aqueous-based, oil-based, or mixtures thereof. Where the base fluid is aqueous-based, the water utilized can be fresh water, salt water (e.g., water containing one or more salts dissolved therein), brine, or seawater. Generally, the water can be from any source provided that it does not contain an excess of compounds that may adversely affect other components in the treatment fluid. Where the base fluid is oil-based, examples of suitable oils include, but are not limited to, mineral oils, synthetic oils, esters, and the like. Generally, any oil that can be emulsified is suitable for use as a base fluid in the treatment fluids of the present invention. Generally, the base fluid is present in an amount sufficient to form a pumpable treatment fluid. More particularly, the base fluid is typically present in the treatment fluid in an amount in the range of from about 60% to about 99.99% by volume of the treatment fluid.

The treatment fluids of the present invention further comprise a portion of VPWM particles. The VPWM particles of the present invention comprise hollow, elastically deformable particles. Any hollow, elastically deformable particle having a specific gravity in the range of from about 0.1 to about 0.5 which is shear resistant and fatigue resistant may be suitable for use with the treatment fluids of the present invention. Further, to achieve certain beneficial effects of the present invention where the treatment fluids are used in drilling operations, the VPWM particles should be able to withstand the rigors of being pumped and circulated through a drill bit, e.g., they should be of a size small enough to be pumped and circulated through the drill bit and other drilling equipment including the shale shaker, and they should be resistant to the temperatures and pressures that they will encounter during drilling operations. In certain exemplary embodiments where the treatment fluids are used in drilling operations, the VPWM particles resist adhering to the drill pipe, the drill bit, or the subterranean formation. In certain embodiments, the VPWM particles can withstand temperatures of up to about 500° F., and pressures of up to about 21,000 psi.

The VPWM particles may comprise such materials as elastomers, plastics and metals. An example of a suitable elastomer is a material such as VITON™; an example of a suitable plastic is a material such as high molecular weight polyethylene; and examples of a suitable metal include materials such as beryllium copper and memory metals such as NiTi. When deciding upon the particular type of material for inclusion in the VPWM particles, one of ordinary skill in the art with the benefit of this disclosure may choose to consider the fact that if the VPWM particles comprises elastomers, and such elastomers subsequently fail at some point in the subterranean operation being performed, there will be minimal adverse impact to the treatment fluid because the elastomers have a low specific gravity, whereas if VPWM particles comprising a metal subsequently fail, the VPWM particles may increase the density of the treatment fluid. The diaphragm thickness of the VPWM particles is an important consideration because, inter alia, the VPWM particles must be able to flex when placed under pressure, thereby changing their volume and density as a function of pressure. For example, as the VPWM particles flex inward their volume decreases, thereby increasing their density. The preferred thickness of the walls forming the VPWM particles will vary depending on the material of choice. One of ordinary skill in the art with the benefit of this disclosure will be able to recognize the appropriate diaphragm thickness for a particular material.

Certain embodiments of the VPWM particles of the present invention will further comprise a compressible fluid. Suitable compressible fluids include, but are not limited to, air, propane, ammonia, fluorinated hydrocarbon refrigerants, nitrogen, carbon dioxide, argon, and mixtures thereof. In certain embodiments, the VPWM particles have an internal pressure designed to tune the manner in which the density of the VPWM particles responds to the downhole pressures of a well. Generally, the internal pressure of the VPWM particles may range from about 0 to about 100 psi. Generally, the internal pressure of the VPWM particles will be based on considerations such as the theoretical hydrostatic head to which the VPWM particles may be exposed, and the safety of personnel.

The VPWM particles may be configured in a wide variety of shapes. In certain preferred embodiments, the VPWM particles are configured as hollow tubes or pipes. The overall size of the VPWM particles is not critical to the current invention; however, in certain preferred embodiments the VPWM particles will generally be small enough to pass through downhole tools without fouling or damaging the tool. Thus, the external diameter of each VPWM particle will generally be less than about ⅛ inch. When the particle is in the form of a hollow tube, one of ordinary skill in the art with the benefit of this disclosure will recognize the appropriate length to diameter ratio for a particular application. For example, it is thought that the efficiency of particle screening mechanisms decreases as a VPWM particle becomes increasingly rod-like, e.g., as the length of the VPWM increases relative to its diameter. In certain exemplary embodiments, the length to diameter ratio of the VPWM may range from about 1:1 to about 2:1.

The VPWM particles may be made by any process that produces VPWM particles suitable for a particular application. One of ordinary skill in the art, with the benefit of this disclosure, will recognize the appropriate process to produce a VPWM particle for a particular application. In one embodiment, the VPWM particles are made by a process comprising the pressurization and sealing of a hollow rod or tube formed from an elastically deformable material. For example, a first end of a hollow rod or tube formed from an elastically deformable material may be crimped and sealed, after which the rod or tube may be pressurized to a desired pressure, after which a second end of the tube may be crimped and sealed. The tube may then be cut to form a VPWM particle of a desired length.

In another embodiment, the VPWM particles may have the shape of a disk. One example of a suitable process for manufacturing such particles is a process comprising pressurizing and sealing an assembly of multiple sheets of elastically deformable material together. For example, a first sheet of elastically deformable material having a desirable thickness may be selected, and holes of a pre-designed diameter may be provided in such first sheet. The manufacturing process may be pressurized to a desired pressure, and a second and a third sheet of elastically deformable material may be placed on each side of the first sheet to form an assembly of sheets. The assembly may then be sealed together. A VPWM particle may be produced, for example, by punching such VPWM particle from the sealed assembly, with the punch diameter being slightly larger than the hole diameter, and concentric to it. In certain exemplary embodiments, the second and third sheets (e.g., the two outer sheets) may be dimpled to a certain depth, as exemplified in FIG. 1(a). Where such dimpling is provided, the first and third sheets of the VPWM particle will flex inwards as external pressure increases, until they contact the first innermost sheet, as exemplified in FIG. 1(b); at such point the presence of the center support may cause the VPWM particle to effectively become much stiffer. An exemplary embodiment of such VPWM particle in a state of maximum compression may be seen in FIG. 1(c). A VPWM particle configured with such dimpling may have a nonlinear pressure-density response that will shift functionally as the outer sheets touch the innermost sheet, as illustrated in FIG. 1(d). Optionally, other dimples may be added to provide a VPWM particle having a pressure-density response with still further capability of shifting functionally. One of ordinary skill in the art with the benefit of this disclosure will recognize the applications where dimpling may be desirable, and will further recognize the appropriate depth of such dimples for a particular application.

An important consideration when selecting a particular material for use as a VPWM particle is the amount of stress which will be imposed upon the VPWM particle when in use. Generally, as the VPWM particle encounters progressively higher external pressure, the bending stresses in the walls of the VPWM particle will increase. If the bending stresses exceed the yield stress of the wall material, then the VPWM particle will be permanently deformed, which may result in a shift in the pressure-density response curve for the VPWM particle. This may be particularly true for embodiments where the VPWM particle comprises metal or plastic. Accordingly, the increased resiliency of elastomers as compared to metal or plastic materials may be a relevant consideration when designing a particular VPWM particle.

The relationship between external pressure and the density of a VPWM particle may be altered in a variety of ways, including but not limited to changing: the type of fluid within the VPWM particle; the internal pressure of the VPWM particle; the diaphragm thickness of the VPWM particle; the shape of the VPWM particle, the number and location of dimples of a VPWM particle, and the like. One of ordinary skill in the art with the benefit of this disclosure will recognize the appropriate means by which the pressure-density relationship of a VPWM particle may be modified for a particular application.

The quantity of VPWM particles to be included in the treatment fluids of the present invention will be determined based on considerations which may include but are not limited to the specific gravity of the VPWM particle. For example, where the treatment fluids are used in subterranean drilling operations, the quantity of elastic particles to be included in the treatment fluid will further depend on additional considerations, including but not limited to the depth of the ocean floor, the depth of the borehole, the specific gravity of the VPWM particles, and the overall volume of the borehole and riser. Generally, when the treatment fluids of the present invention are used in subterranean drilling operations, the VPWM particles will be present in the treatment fluids of the present invention in an amount sufficient to cause the density of the treatment fluid to vary once placed in the subterranean formation such that the treatment fluid provides a desired degree of operational control when circulating through the subterranean formation, and can return through the riser to the surface without any additional pumps or subsurface additives. More particularly, the VPWM particles will be present in the treatment fluids of the present invention in an amount in the range of from about 0.01% to about 40% by volume of the treatment fluid. One of ordinary skill in the art, with the benefit of this disclosure, will recognize the appropriate quantity of VPWM particles to add to the treatment fluids of the present invention for a particular application.

Figure 2:
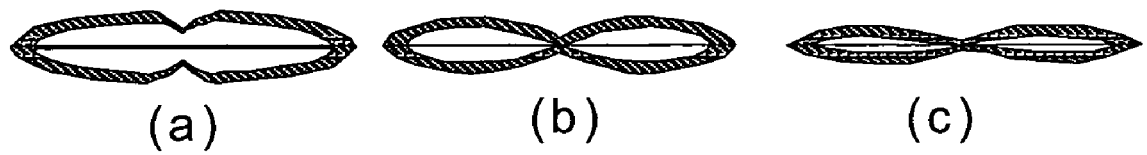
FIG. 2(a) shows a side view of an exemplary embodiment of a variable pressure weighting material particle of the present invention.
FIG. 2(b) shows a side view of the exemplary embodiment of FIG. 1(a), under compression.
FIG. 2(c) shows a side view of the exemplary embodiment of FIG. 1(a), under maximum compression.
FIG. 2(d) is a graphical representation of the pressure-density curve of the exemplary embodiment of FIGS. 2(a)–(c).
Figure 2D:
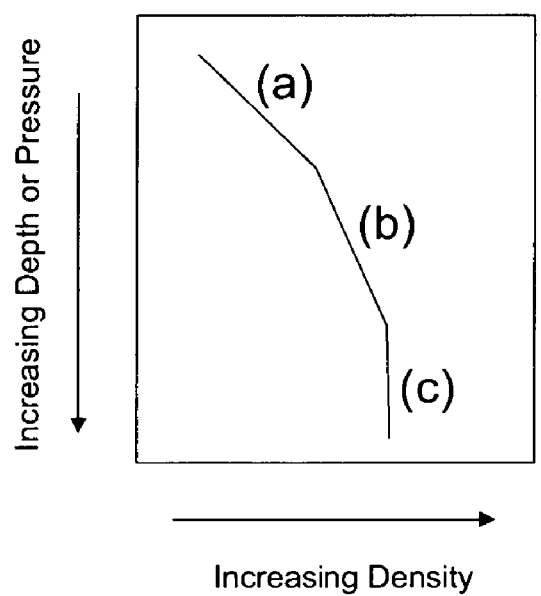

Among other benefits, the presence of the VPWM particles in the treatment fluids of the present invention causes the density of the treatment fluids to vary as a function of pressure. As the VPWM particles encounter higher downhole pressures, they compress, thereby reducing their volume and increasing their density, as illustrated in FIG. 2. The reduction in volume of the VPWM particles in turn increases the density of the treatment fluid. When the VPWM particles are fully compressed, certain exemplary embodiments of the variable density treatment fluid may have a density in the range of from about 0.01% to about 300% higher than their density measured at sea level. For example, where the treatment fluids of the present invention are used in a subterranean drilling operation, such treatment fluid may flow downward through the drill pipe, exit the drill bit, and recirculate upward through the borehole and into the lower pressure region of the riser. Within the riser, the pressure on such drilling fluid decreases, causing a corresponding decrease in the density of the drilling fluid, as the VPWM particles begin to expand and increase in volume due to the drop in external pressure. In exemplary embodiments where the treatment fluids of the present invention are used in subterranean drilling operations, the resulting drop in density is sufficient to permit the return of the treatment fluid through the riser to the surface without any additional pumps or subsurface additives. Thus, drilling operations with a treatment fluid of the present invention will not require the subsurface or ocean floor injection of additives in order to reduce the density of the treatment fluid. The variable density nature of the treatment fluids of the present invention may also, inter alia, minimize loss of circulation of a drilling fluid into regions of the subterranean formation adjacent to the bore hole, inter alia, because the treatment fluid may be formulated so that its density is sufficient to control kicks yet avoid fracturing the subterranean formation. For example, at shallower depths where the formation may be more easily fractured inadvertently, the treatment fluid may have a lower density. The treatment fluid may subsequently have a higher density at greater depths.

Optionally, the treatment fluids of the present invention may also contain fixed-density weighting agents. Such weighting agents are typically heavy minerals such as barite, hematite, or the like. These fixed-density weighting agents, inter alia, may increase the density of the treatment fluid sufficiently to offset high pressures which may be encountered during certain phases of the treatment operation. The fixed-density weighting agents are relatively inexpensive compared to the variable pressure weighting material of the present invention. However, the density of such fixed-density weighting agents will not be able to vary with pressure as will the density of the variable pressure weighting material. In determining the relative amounts of fixed-density weighting agents and variable pressure weighting material to add to the treatment fluid to affect the treatment fluid's density, the added expense produced by the use of variable pressure weighting material may be considered in light of the degree of improved density control and operability that the resulting treatment fluid may develop through the use of such variable pressure weighting material. One of ordinary skill in the art with the benefit of this disclosure will recognize the appropriate balance for a given application.

Where used, the fixed-density weighting agents may be present in the treatment fluid in an amount in the range of from about 0.01% to about 40% by volume of the base fluid.

Additional additives may be added to the treatment fluids of the present invention as deemed appropriate by one skilled in the art for improving the performance of the treatment fluid with respect to one or more properties. Examples of such additives include, but are not limited to, emulsifiers, viscosifiers, fluid loss additives, salts, shale swelling inhibitors, and numerous other additives suitable for use in subterranean operations.

The use of the treatment fluids of the present invention may also benefit other subterranean applications as well. For example, where such treatment fluids are used as fracturing or acidizing fluids, the variable density nature of the fluid may permit easier recovery of the spent fracturing or acidizing fluid from the subterranean formation at the end of the operation, thereby eliminating the need to use additional manpower or pumping equipment to accomplish such task. Although described solely in the offshore environment, the methods of the current invention may be equally useful in onshore wells. For example, when used in onshore wells which have small differences between pore pressure and fracture gradient, a drilling fluid comprising a treatment fluid of the present invention may provide a sufficient degree of operational control without fracturing the subterranean formation inadvertently, or without necessitating the installation of additional casing to prevent such inadvertent fracturing.

While a number of exemplary embodiments described herein relate to drilling fluids and compositions, it will be understood that any well treatment fluid such as drilling, completion and stimulation fluids including, but not limited to, drilling muds, well cleanup fluids, workover fluids, spacer fluids, gravel pack fluids, acidizing fluids, fracturing fluids, and the like, may be prepared using a treatment fluid of the present invention. Accordingly, an example of a method of the present invention is a method of using a treatment fluid in a subterranean formation comprising introducing a fluid having a density that varies as a function of the pressure in the subterranean formation, wherein the fluid comprises a base fluid and a portion of variable pressure weighting material particles. Additional steps may comprise: drilling, completing and/or stimulating a subterranean formation using the treatment fluid; and producing a fluid, e.g., a hydrocarbon fluid such as oil or gas, from the subterranean formation.

An example of a drilling fluid composition of the present invention comprises about 75% water by volume and about 25% variable pressure weighting material particles by volume.

To facilitate a better understanding of the present invention, the following example of one of the exemplary embodiments is given. In no way should such example be read to limit the scope of the invention.

EXAMPLE 1

Figure 3:
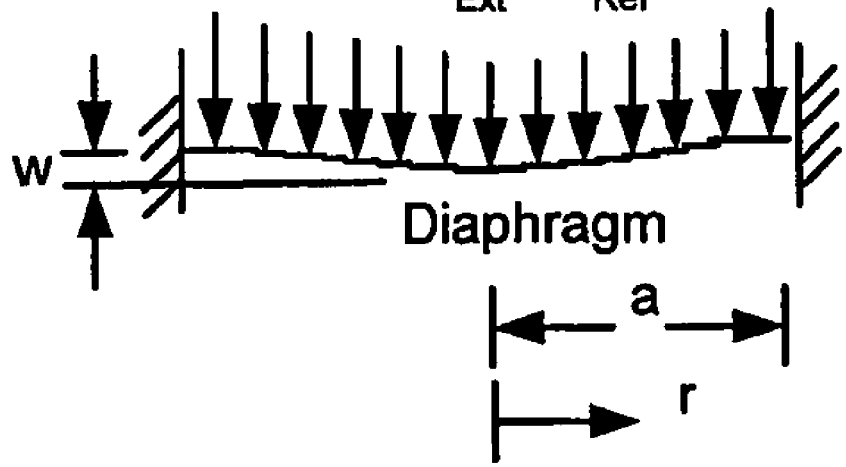
FIG. 3 illustrates a portion of a clamped circular plate with a uniformly distributed load, the simulated behavior of which may be used to model the behavior of certain exemplary embodiments of VPWM particles of the present invention.

A numerical simulation was performed to model embodiments of a VPWM particle of the present invention comprising elastomeric materials configured in the shape of a disk. Each of the two sides of the disk may behave like a pressure-loaded diaphragm. Thus, each side of the disk may be evaluated as a circular plate subjected to a uniformly distributed loading, as illustrated in FIG. 3. The deflection of such circular plate when subjected to such loading depends on factors such as the circular plate's material properties, geometric properties, as well as upon certain boundary conditions and the magnitude of the loading. A variety of formulae for particular plate and load configurations may be found in textbooks such as "Roark's Formulas for Stress and Strain" by Young and Roark, as well as "Formulas for Stress, Strain and Structural Matrices" by Pilkey.

The deflection of one side of the VPWM particles that are the subject of this example will be modeled as that of a clamped circular plate with a uniformly distributed load, as depicted in FIG. 3, for which model the following equations are relevant:

$$D = [Eh^3]/[12*(1-v^2)] \quad \text{Equation 1}$$

$$w(r) = \frac{(P-p_0)a^4[1-(r/a)^2]^2}{64D} \quad \text{Equation 2}$$

$$Volume_{reduced} \cong 2 \times \sum_{i=1}^{n} 2\pi(r_i)(r_i - r_{i-1})(w(r_i)) \quad \text{Equation 3}$$

$$VPWM_{mass} = [2(a+z)^2 h + ((a+z)^2 - (a)^2)T]S\pi \quad \text{Equation 4}$$

$$VPWM_{volume} \cong (a+z)^2(T+2h)\pi - Volume_{reduced} \quad \text{Equation 5}$$

$$VPWM_{density} \cong VPWM_{mass}/VPWM_{volume} \quad \text{Equation 6}$$

$$VPWM_{specific\ gravity} \cong VPWM_{density}/Water_{density\ at\ reference\ temperature} \quad \text{Equation 7}$$

In the above equations, D is the bending rigidity of the plate, E is the Young's Modulus of the plate material, h is the wall thickness of the plate material, v is the Poisson's ratio of the plate material, w(r) is the deflection of the plate at a point r. P represents the external pressure acting upon the plate, and $p_0$ represents the internal pressure within the VPWM particle. The distance from the center of the disk of a point anywhere along the surface of the side of the disk may be represented by r, where 0<r<a. The inner diameter of the plate is 2*a. The overlap of the diaphragm plates is z, the internal separation distance is T, and S represents the density of the material used to manufacture the VPWM particle, as measured at atmospheric temperature and pressure. In all Examples, the overlap z is assumed to be 0.015 inches.

The specific gravity of a VPWM may be found by employing Equation 1 to determine D, then using Equation 2 to determine w(r) at a given external pressure P and internal pressure $p_o$. The maximum value for w(r) is one half the separation distance of each side of the VPWM which is T/2. Once w(r) has been determined for a given P and $p_o$, Equation 3 may then be used to determine the decrease in the internal volume for the VPWM particle at the given P and $p_o$, by performing a summation of the reduction in the volume of the VPWM particle at each incremental point along the VPWM particle's radius. For Example 2, the internal volume decrease was used to determine the internal pressure increase by iterating the external pressure P and calculating a new internal pressure, then applying ideal gas laws. For Examples 1, 3 and 4, the internal pressure of the particle $p_o$ was assumed to be 0, and was ignored.

Equation 4 may be used to calculate the mass of the VPWM particle. Equation 5 may be used to calculate the volume of the VPWM particle. The VPWM density may then be found by dividing the VPWM particle volume by its mass, as shown in Equation 6. The VPWM specific gravity may then be calculated by dividing the VPWM density by the density of water at a chosen reference temperature.

Sample Composition No. 1 represents a VPWM particle formed from a VITON™ elastomer having an inner diameter of 0.1 inches, a diaphragm thickness of 0.02 inches, and a distance T of 0.02 inches.

Sample Composition No. 2 represents a VPWM particle formed from a VITON™ elastomer having an inner diameter of 0.1 inches, a diaphragm thickness of 0.02 inches, and a distance T of 0.04 inches.

Sample Composition No. 3 represents a VPWM particle formed from a VITON™ elastomer having an inner diameter of 0.2 inches, a diaphragm thickness of 0.02 inches, and a distance T of 0.04 inches.

The model ignored the internal fluid compression. The model assumed each exemplary VPWM particle comprised two uniformly pressurized disks with rigidly supported edges separated by a fixed distance. The model further assumed that each side of the disk or diaphragm would only deform a distance equal to one half the separation distances, which reflects the fact that at maximum compression, the two sides would touch at a point in the middle of the disk. Additionally, the model assumed that each exemplary VPWM particle had a Young's Modulus of $0.00049 \times 10^6$, a Poisson's Ratio of 0.4, and a specific gravity (S) at standard conditions of 0.98 (e.g., a density of 0.98 grams per cubic centimeter). The results of the numerical model are presented in Table 1 below.

TABLE 1

| | Specific Gravity | | |
|---|---|---|---|
| Pressure (psi) | Sample Composition No. 1 | Sample Composition No. 2 | Sample Composition No. 3 |
| 0 | 0.78 | 0.69 | 0.61 |
| 1,000 | 0.93 | 0.88 | 0.94 |
| 5,000 | 0.95 | 0.92 | 0.96 |
| 10,000 | 0.96 | 0.94 | 0.96 |
| 12,000 | 0.96 | 0.94 | 0.96 |

Figure 4:
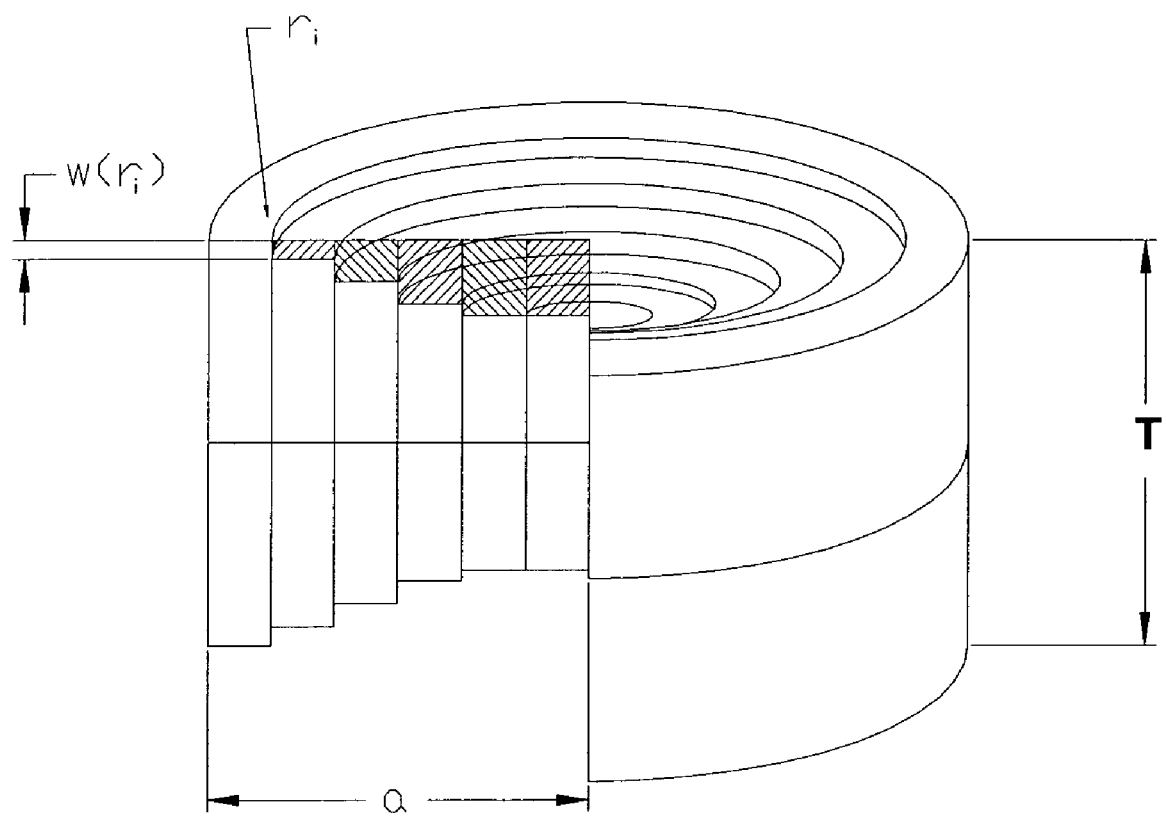
FIG. 4 shows a partial cross-section of an exemplary VPWM particle of the present invention.

In this example, the specific gravities of the VITON™ elastomeric VPWM particles ranged from about 0.60 to about 0.96, which represents about a 60% density change from their unpressurized state (e.g., their state at about sea level). The data in Table 1 is also depicted graphically in FIG. 4, which also provides the typical pressure that would be expected from an 8,000 foot column height of sea water, for comparison purposes.

EXAMPLE 2

A numerical simulation was performed to model embodiments of a VPWM particle of the present invention comprising elastomeric materials configured in the shape of a disk.

Sample Composition No. 4 represents a VPWM particle formed from a VITON™ elastomer having an inner diameter of 0.1 inches, a diaphragm thickness of 0.02 inches, and a distance T of 0.04 inches, and an internal pressure of 0 psi.

Sample Composition No. 5 represents a VPWM particle formed from a VITON™ elastomer having an inner diameter of 0.1 inches, a diaphragm thickness of 0.02 inches, a distance T of 0.04 inches, and an internal pressure of 25 psi.

Sample Composition No. 6 represents a VPWM particle formed from a VITON™ elastomer having an inner diameter of 0.1 inches, a diaphragm thickness of 0.02 inches, and a distance T of 0.04 inches, and an internal pressure of 100 psi.

Sample Composition No. 7 represents a VPWM particle formed from a VITON™ elastomer having an inner diameter of 0.1 inches, a diaphragm thickness of 0.02 inches, and a distance T of 0.04 inches, and an internal pressure of 200 psi.

The model assumed each exemplary VPWM particle comprised two uniformly pressurized disks with rigidly supported edges separated by a fixed distance. The model further assumed that each side of the disk or diaphragm would only deform a distance equal to one half the separation distances, which reflects the fact that at maximum compression, the two sides would touch at a point in the middle of the disk. Additionally, the model assumed that each exemplary VPWM particle had a Young's Modulus of $0.00049 \times 10^6$, a Poisson's Ratio of 0.4, and a specific gravity (S) at standard conditions of 0.98 (e.g., a density of 0.98 grams per cubic centimeter). The results of the numerical model are presented in Table 2 below.

TABLE 2

| | Specific Gravity | | | |
|---|---|---|---|---|
| Pressure (psi) | Sample Composition No. 4 | Sample Composition No. 5 | Sample Composition No. 6 | Sample Composition No. 7 |
| 0 | 0.69 | 0.67 | 0.64 | 0.172 |
| 1,000 | 0.88 | 0.875 | 0.86 | 0.813 |
| 2,500 | 0.91 | 0.91 | 0.902 | 0.89 |
| 5,000 | 0.925 | 0.925 | 0.917 | 0.91 |
| 10,000 | 0.936 | 0.936 | 0.93 | 0.925 |
| 12,000 | 0.94 | 0.94 | 0.935 | 0.93 |

In this example, the specific gravities of the VITON™ elastomeric VPWM particles ranged from about 0.172 to about 0.94, which represents about a 546% density change from their unpressurized state (e.g., their state at about sea level). The data in Table 2 is also depicted graphically in FIG. 4, which also provides the typical pressure that would be expected from an 8,000 foot column height of sea water, for comparison purposes.

EXAMPLE 3

A numerical simulation was performed to model embodiments of a VPWM particle of the present invention comprising polyethylene configured in the shape of a disk.

Sample Composition No. 8 represents a VPWM particle formed from polyethylene having an inner diameter of 0.1 inches, a diaphragm thickness of 0.02 inches, and a distance T of 0.02 inches.

Sample Composition No. 9 represents a VPWM particle formed from polyethylene having an inner diameter of 0.1 inches, a diaphragm thickness of 0.02 inches, and a distance T of 0.04 inches.

Sample Composition No. 10 represents a VPWM particle formed from polyethylene having an inner diameter of 0.2 inches, a diaphragm thickness of 0.02 inches, and a distance T of 0.04 inches.

Sample Composition No. 11 represents a VPWM particle formed from polyethylene having an inner diameter of 0.4 inches, a diaphragm thickness of 0.02 inches, and a distance T of 0.04 inches.

Sample Composition No. 12 represents a VPWM particle formed from polyethylene having an inner diameter of 0.5 inches, a diaphragm thickness of 0.02 inches, and a distance T of 0.04 inches.

The model ignored the internal fluid compression. The model assumed each exemplary VPWM particle comprised two uniformly pressurized disks with rigidly supported edges separated by a fixed distance. The model further assumed that each side of the disk or diaphragm would only deform a distance equal to one half the separation distances. Additionally, the model assumed that each exemplary VPWM particle had a Young's Modulus of $0.1 \times 10^6$, a Poisson's Ratio of 0.4, and a specific gravity (S) at standard conditions of 0.93 (e.g., a density of 0.93 grams per cubic centimeter). The results of the numerical model are presented in Table 3 below.

TABLE 3

| | Specific Gravity | | | | |
|---|---|---|---|---|---|
| Pressure (psi) | Sample Composition No. 8 | Sample Composition No. 9 | Sample Composition No. 10 | Sample Composition No. 11 | Sample Composition No. 12 |
| 0 | 0.75 | 0.66 | 0.58 | 0.53 | 0.51 |
| 1,000 | 0.76 | 0.66 | 0.64 | 0.81 | 0.84 |
| 5,000 | 0.78 | 0.68 | 0.77 | 0.87 | 0.89 |
| 10,000 | 0.8 | 0.69 | 0.81 | 0.89 | 0.9 |
| 12,000 | 0.81 | 0.7 | 0.82 | 0.89 | 0.91 |

Figure 5:
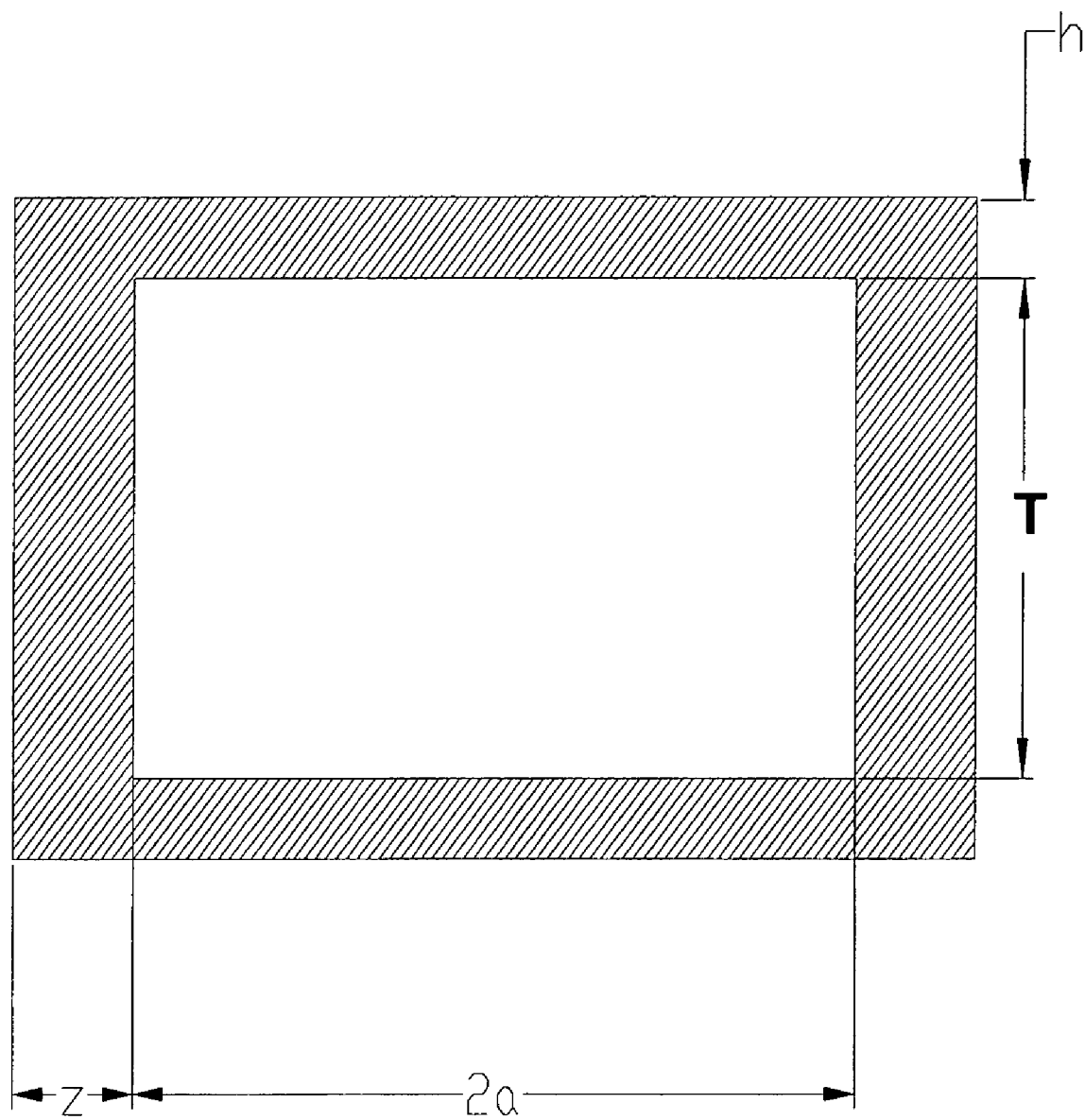
FIG. 5 is a cross-section of an exemplary disk-shaped VPWM particle.

In this example, the specific gravities of the polyethylene VPWM particles ranged from about 0.52 to about 0.91, which represents about a 75% density change from their unpressurized state (e.g., their state at about sea level). The data in Table 3 is also depicted graphically in FIG. 5, which also provides the typical pressure that would be expected from an 8,000 foot column height of sea water, for comparison purposes.

EXAMPLE 4

A numerical simulation was performed to model embodiments of a VPWM particle of the present invention comprising beryllium copper configured in the shape of a disk.

Sample Composition No. 13 represents a VPWM particle formed from beryllium copper having an inner diameter of 0.1 inches, a diaphragm thickness of 0.01 inches, and a distance T of 0.02 inches.

Sample Composition No. 14 represents a VPWM particle formed from beryllium copper having an inner diameter of 0.1 inches, a diaphragm thickness of 0.01 inches, and a distance T of 0.04 inches.

Sample Composition No. 15 represents a VPWM particle formed from beryllium copper having an inner diameter of 0.2 inches, a diaphragm thickness of 0.01 inches, and a distance T of 0.04 inches.

Sample Composition No. 16 represents a VPWM particle formed from beryllium copper having an inner diameter of 0.4 inches, a diaphragm thickness of 0.01 inches, and a distance T of 0.04 inches.

Sample Composition No. 17 represents a VPWM particle formed from beryllium copper having an inner diameter of 0.5 inches, a diaphragm thickness of 0.01 inches, and a distance T of 0.04 inches.

Sample Composition No. 18 represents a VPWM particle formed from beryllium copper having an inner diameter of 0.5 inches, a diaphragm thickness of 0.02 inches, and a distance T of 0.04 inches.

The model ignored the internal fluid compression. The model assumed each exemplary VPWM particle comprised two uniformly pressurized disks with rigidly supported edges separated by a fixed distance. The model further assumed that each side of the disk or diaphragm would only deform a distance equal to one half the separation distances. Additionally, the model assumed that each exemplary VPWM particle had a Young's Modulus of 30×10$^6$, a Poisson's Ratio of 0.3, and a specific gravity (S) at standard conditions of 7.7 (e.g., a density of 7.7 grams per cubic centimeter). The results of the numerical model are presented in Table 4 below.

TABLE 4

| | Specific Gravity | | | | | |
|---|---|---|---|---|---|---|
| Pressure (psi) | Sample Composition No. 13 | Sample Composition No. 14 | Sample Composition No. 15 | Sample Composition No. 16 | Sample Composition No. 17 | Sample Composition No. 18 |
| 0 | 5.42 | 4.66 | 3.8 | 3.26 | 3.13 | 4.27 |
| 1,000 | 5.56 | 4.75 | 5.22 | 5.11 | 4.15 | 4.46 |
| 5,000 | 6.02 | 4.99 | 6.17 | 5.41 | 4.61 | 5.07 |
| 10,000 | 6.51 | 5.55 | 6.62 | 5.48 | 4.73 | 5.31 |
| 12,000 | 6.59 | 5.67 | 6.69 | 5.5 | 4.76 | 5.36 |

Figure 6:
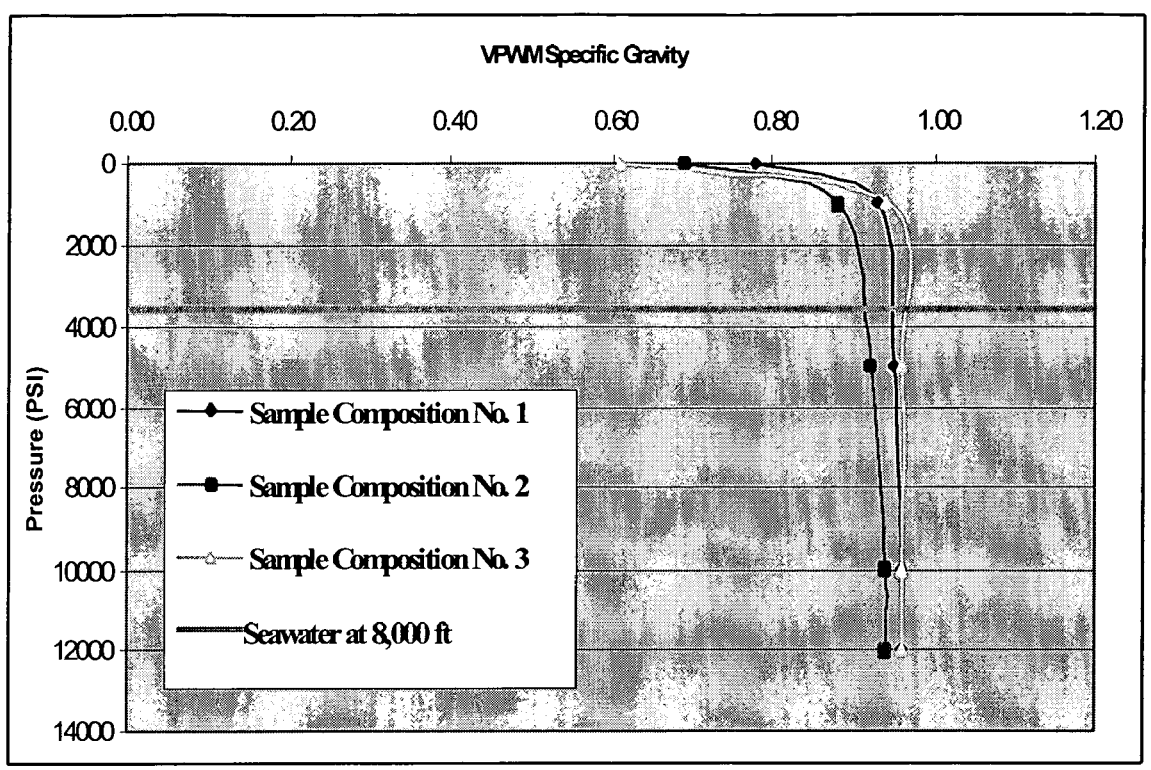
FIG. 6 is a graphical representation of exemplary pressure-density curves for certain exemplary embodiments of VPWM particles comprising elastomers.
Figure 7:
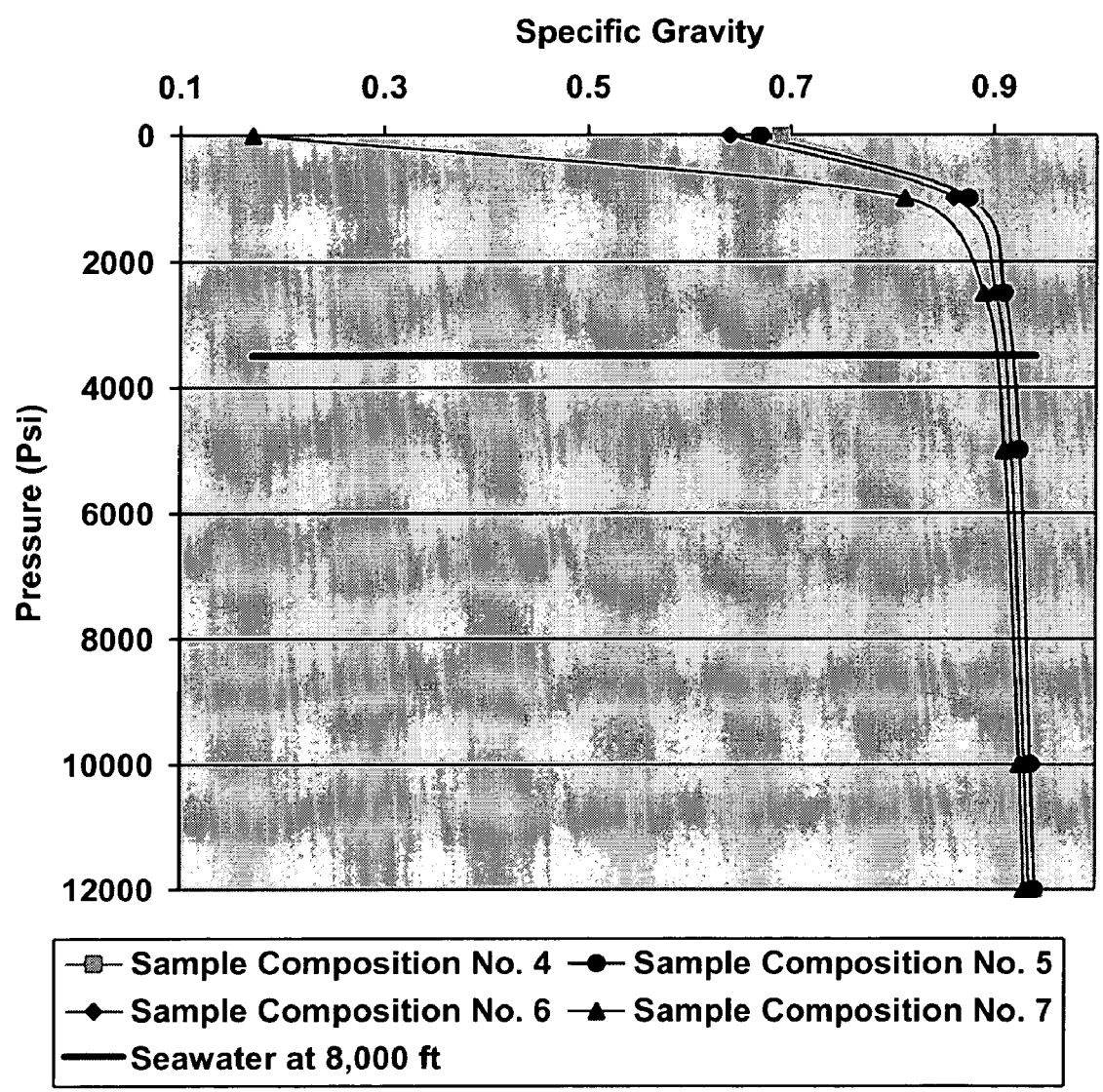
FIG. 7 is a graphical representation of exemplary pressure-density curves for certain other exemplary embodiments of VPWM particles comprising elastomers
Figure 8:
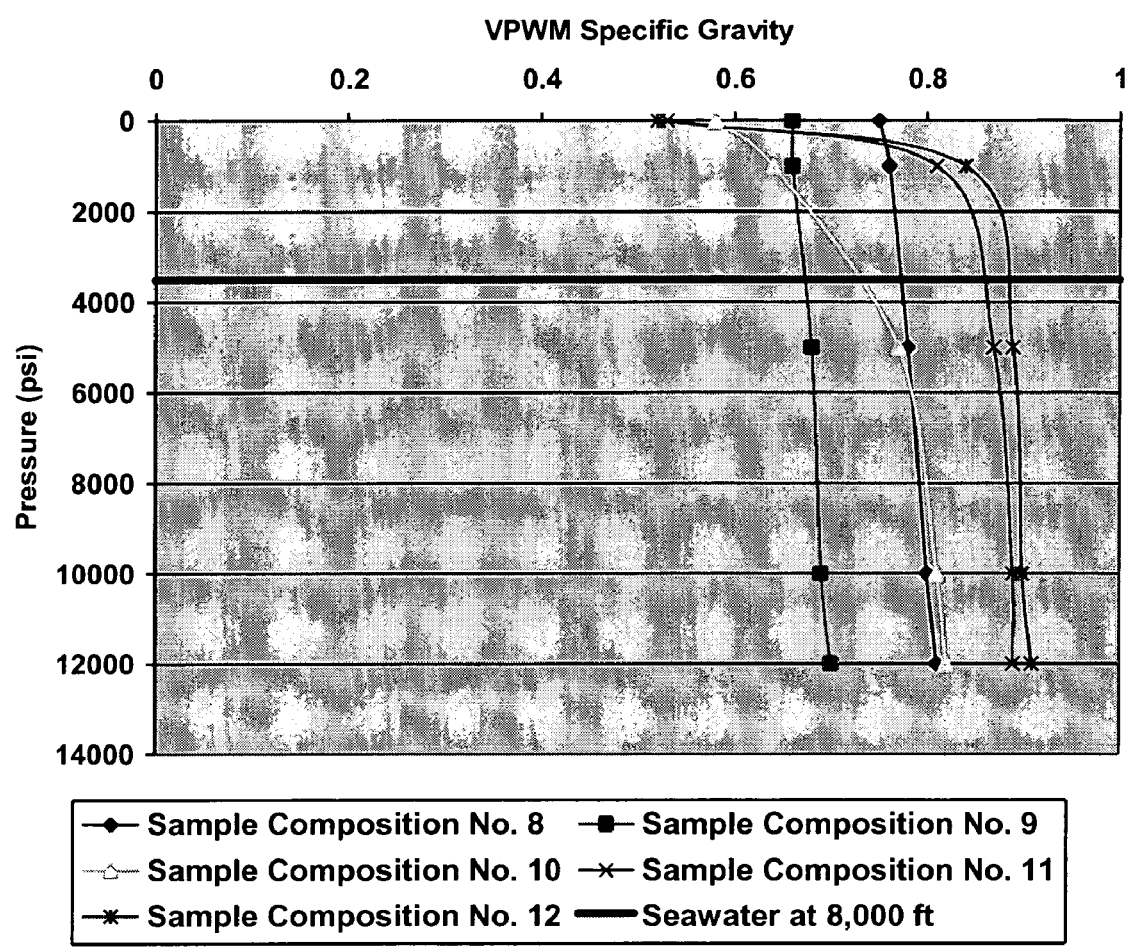
FIG. 8 is a graphical representation of exemplary pressure-density curves for certain exemplary embodiments of VPWM particles comprising polyethylene.
Figure 9:
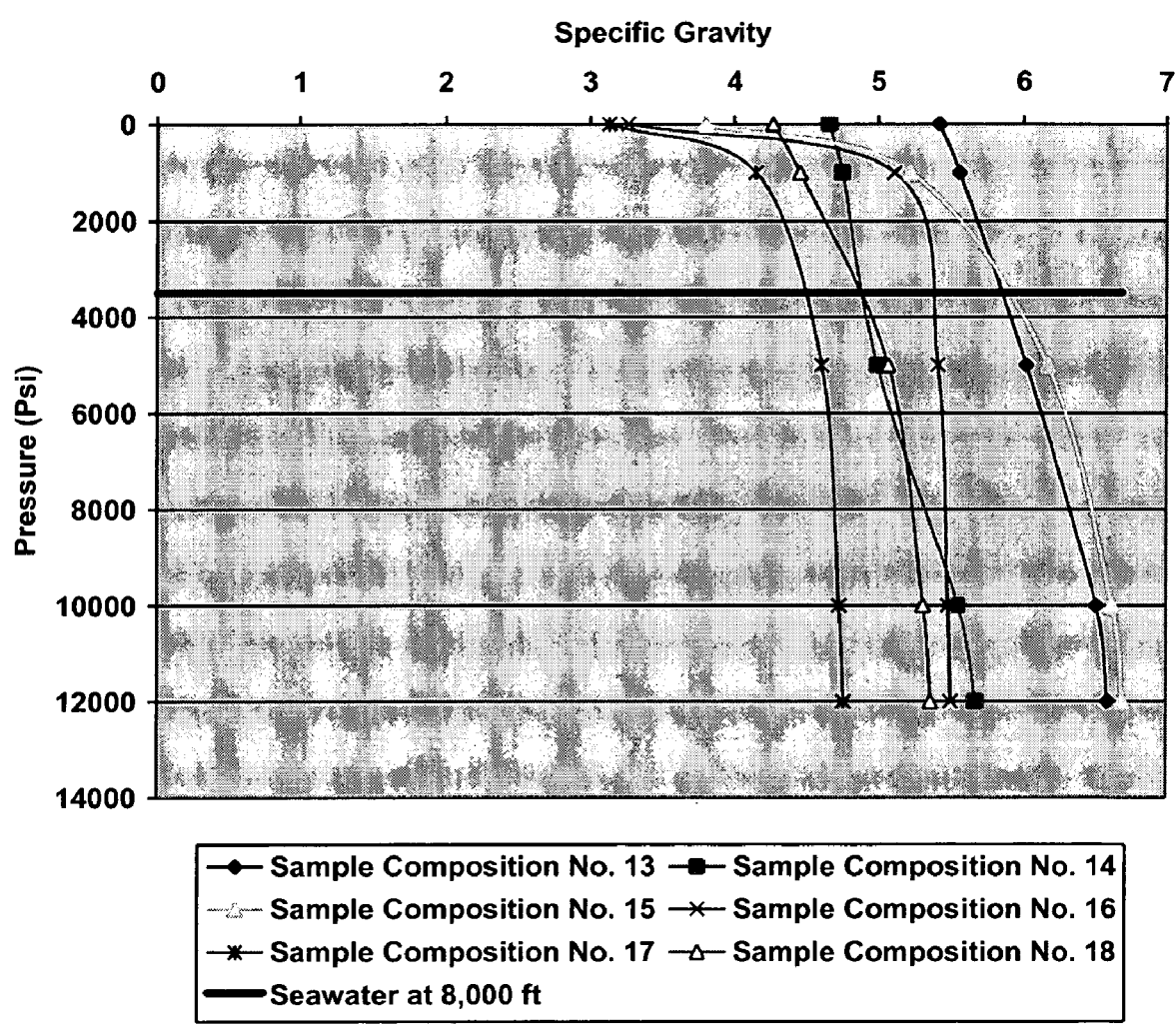
FIG. 9 is a graphical representation of exemplary pressure-density curves for certain exemplary embodiments of VPWM particles comprising metal.

In this example, the specific gravities of the beryllium copper VPWM particles ranged from about 3.13 to about 6.69, which represents about a 113% density change from their unpressurized state (e.g., their state at about sea level). The data in Table 4 is also depicted graphically in FIG. 6, which also provides the typical pressure that would be expected from an 8,000 foot column height of sea water, for comparison purposes.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

We claim:

1. A method of using a treatment fluid in a subterranean formation comprising introducing a treatment fluid having a density that varies as a function of pressure into a subterranean formation, wherein the treatment fluid comprises a base fluid and a portion of variable pressure weighting material particles.

2. The method of claim 1 wherein the treatment fluid is used as a well fluid.

3. The method of claim 2 wherein the well fluid is selected from the group consisting of drilling fluids, completion fluids, and stimulation fluids.

4. The method of claim 2 wherein the well fluid is selected from the group consisting of drilling muds, well cleanup fluids, workover fluids, spacer fluids, gravel pack fluids, acidizing fluids, and fracturing fluids.

5. The method of claim 4 further comprising the step of drilling, completing and/or stimulating a subterranean formation using the treatment fluid.

6. The method of claim 5 further comprising the step of producing a fluid from the subterranean formation.

7. The method of claim 6 wherein the fluid comprises oil, gas, or a mixture thereof.

8. The method of claim 1 wherein the treatment fluid has a density at sea level in the range of from about 6 lb/gallon to about 18 lb/gallon.

9. The method of claim 1 wherein the base fluid is oil, water, or a mixture thereof.

10. The method of claim 1 wherein the base fluid is present in the treatment fluid in an amount in the range of from about 60% to about 99.99% by volume.

11. The method of claim 1 wherein the portion of variable pressure weighting material particles is present in the treatment fluid in an amount in the range of from about 0.01% to about 40% by volume of the treatment fluid.

12. The method of claim 1 wherein the variable pressure weighting material particles have a specific gravity in the range of from about 0.1 to about 0.5.

13. The method of claim 1 wherein the variable pressure weighting material particle further comprises a compressible fluid.

14. The method of claim 13 wherein the compressible fluid comprises air, propane, ammonia, fluorinated hydrocarbon refrigerants, nitrogen, carbon dioxide, argon or a mixture thereof.

15. The method of claim 1 wherein a portion of the variable pressure weighting material particles can withstand a pressure of up to about 21,000 psi without crushing.

16. The method of claim 15 wherein a portion of the variable pressure weighting material particles can rebound to about their original size and shape when pressure is removed.

17. The method of claim 1 wherein a portion of the variable pressure weighting material particles can withstand temperatures up to about 500° F. without degrading.

18. The method of claim 1 wherein the subterranean formation comprises a borehole, and wherein the density of the treatment fluid increases as the pressure in the bore hole increases.

19. The method of claim 18 wherein the density of the treatment fluid in the bore hole is in the range of from about 0.01% to about 300% higher than its density at sea level.

20. The method of claim 18 wherein the density of the treatment fluid in the borehole is sufficient to prevent kicks without fracturing a region of the subterranean formation adjacent to the borehole.

21. The method of claim 1 wherein the subterranean formation is located beneath the ocean floor.

22. The method of claim 21 wherein the density of the treatment fluid decreases as the treatment fluid travels from the ocean floor to sea level.

23. The method of claim 1 wherein the treatment fluid further comprises a salt, a fluid loss additive, a shale swelling inhibitor, an emulsifier, a viscosifier, caustic, or a fixed-density weighting agent.

24. The method of claim 1 wherein the variable pressure weighting material particle comprises a material selected from the group consisting of: a plastic, an elastomer, and a metal.

25. The method of claim 24 wherein the metal is a memory metal.

* * * * *

(12) EX PARTE REEXAMINATION CERTIFICATE (7627th)
United States Patent
Jamison

(10) Number: US 7,108,066 C1
(45) Certificate Issued: Jul. 20, 2010

(54) VARIABLE DENSITY TREATMENT FLUIDS AND METHODS OF USING SUCH FLUIDS IN SUBTERRANEAN FORMATIONS

(75) Inventor: Dale E. Jamison, Humble, TX (US)

(73) Assignee: Halliburton Energy Services, Inc., Houston, TX (US)

Reexamination Request:
No. 90/010,296, Sep. 26, 2008

Reexamination Certificate for:
Patent No.: 7,108,066
Issued: Sep. 19, 2006
Appl. No.: 10/765,510
Filed: Jan. 27, 2004

(51) Int. Cl.
*E21B 43/22* (2006.01)
*E21B 21/00* (2006.01)
*E21B 43/25* (2006.01)

(52) U.S. Cl. .................. 166/305.1; 166/307; 166/308.2; 166/308.3; 166/308.4; 175/65; 175/69; 175/72; 507/102; 507/117; 507/140; 507/202; 507/219; 507/270; 507/925

(58) Field of Classification Search ........................ None
See application file for complete search history.

(56) References Cited

U.S. PATENT DOCUMENTS

| | | |
|---|---|---|
| 2004/0144537 A1 | 7/2004 | Reddy et al. |
| 2004/0171499 A1 | 9/2004 | Ravi et al. |
| 2005/0113262 A1 | 5/2005 | Ravi et al. |

OTHER PUBLICATIONS

U.S. Appl. No. 12/165,760 by Ravi et al. filed Jul. 1, 2008.

*Primary Examiner*—Joseph A. Kaufman

(57) ABSTRACT

The present invention provides variable density fluid compositions and methods for using such compositions in a subterranean formation. One exemplary embodiment of the variable density fluid compositions of the present invention comprises a variable density fluid comprising: a base fluid, and a portion of variable pressure weighting material particles.

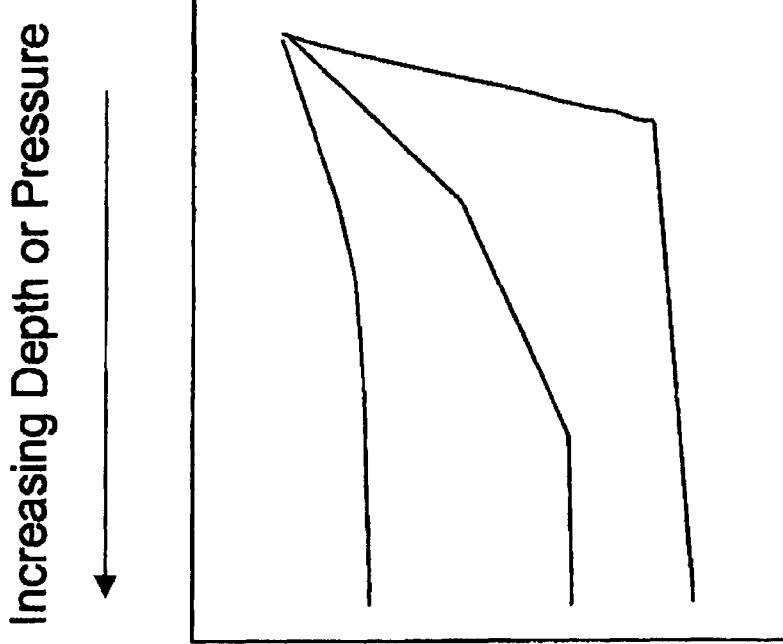

US 7,108,066 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 5, 7-12, 14, 17, 19, 20, 23, and 24 are cancelled.

Claims 1, 3, 6, 13, 18 and 25 are determined to be patentable as amended.

Claims 15, 16, 21 and 22, dependent on an amended claim, are determined to be patentable.

New claims 26-50 are added and determined to be patentable.

1. A method of using a treatment fluid in a subterranean formation comprising[introducing]:
   providing a treatment fluid having a density that varies as a function of pressure [into] *when placed in* a subterranean formation, wherein the treatment fluid comprises a base fluid and *at least* a [portion] *plurality* of variable pressure weighting material particles *that comprise a material selected from the group consisting of a plastic and a metal; and*
   *placing the treatment fluid into a subterranean formation via a borehole;*
   wherein the portion of variable pressure weighting material particles is present in the treatment fluid in an amount in the range of from about 0.01% to about 40% by volume of the treatment fluid.

3. The method of claim [2] *1* wherein the [well] *treatment* fluid is selected from the group consisting of *a* drilling [fluids]*fluid*, *a* completion [fluids and]*fluid*, *a* stimulation [fluids]*fluid, a drilling mud, a well cleanup fluid, a workover fluid, a spacer fluid, a gravel pack fluid, an acidizing fluid, and a fracturing fluid.*

6. The method of claim [5] *1* further comprising the step of producing a fluid from the subterranean formation.

13. The method of claim 1 wherein the variable pressure weighting material particle further comprises a compressible fluid *selected from the group consisting of: air, propane, ammonia, a fluorinated hydrocarbon refrigerant, nitrogen, carbon dioxide, argon, or a mixture thereof.*

18. The method of claim 1 wherein the [subterranean formation comprises a borehole, and wherein the] density of the treatment fluid increases as the pressure in the bore hole increases.

25. The method of claim [24]*1* wherein the metal is a memory metal *or beryllium copper, and/or the plastic is a high molecular weight polyethylene.*

26. *A method comprising:*
   *providing a treatment fluid having a density that varies as a function of pressure when placed in a subterranean formation, wherein the treatment fluid comprises a base fluid and at least a plurality of variable pressure weighting material particles having a shape selected from the group consisting of a hollow tube, a hollow pipe, and a disk; and*
   *placing the treatment fluid in a subterranean formation.*

27. *The method of claim 26 wherein one of the variable pressure weight materials has the shape of a disk, the disk comprising at least one sheet having at least one dimple.*

28. *The method of claim 26 wherein the treatment fluid is selected from the group consisting of a drilling fluid, a completion fluid, a stimulation fluid, a drilling mud, a well cleanup fluid, a workover fluid, a spacer fluid, a gravel pack fluid, an acidizing fluid and a fracturing fluid.*

29. *The method of claim 26 wherein the treatment fluid has a density at sea level in the range of from about 6 lb/gallon to about 18 lb/gallon.*

30. *The method of claim 26 wherein at least one of the variable pressure weighting material particles further comprises a compressible fluid selected from the group consisting of air, propane, ammonia, fluorinated hydrocarbon refrigerants, nitrogen, carbon dioxide, argon or a mixture thereof.*

31. *The method of claim 26 wherein a portion of the variable pressure weighting material particles can withstand a pressure of up to about 21,000 psi without crushing.*

32. *The method of claim 26 wherein the density of the treatment fluid in the bore hole is in the range of from about 0.01% to about 300% higher than its density at sea level.*

33. *The method of claim 26 wherein the subterranean formation is located beneath the ocean floor.*

34. *The method of claim 26 wherein at least one of the variable pressure weighing material particles comprises a material selected from the group consisting of: a plastic, an elastomer, and a metal.*

35. *A method comprising:*
   *providing a treatment fluid having a density that varies as a function of pressure when placed in a subterranean formation, wherein the treatment fluid comprises a base fluid and at least a plurality of variable pressure weighting material particles; and*
   *placing the treatment fluid in a subterranean formation via a borehole as part of a subterranean operation selected from the group consisting of: a stimulation operation, a completion operation, a fracturing operation, an acidizing operation, a well cleanup operation, a workover operation, and a gravel packing operation;*
   *wherein the treatment fluid has a density at sea level in the range of from about 6 lb/gallon to about 18 lb/gallon.*

36. *The method of claim 35 further comprising the step of producing a fluid from the subterranean formation.*

37. *The method of claim 35 wherein a portion of the variable pressure weighting material particles can withstand temperatures up to about 500° F. without degrading.*

38. *The method of claim 35 wherein the density of the treatment fluid increases as the pressure in the bore hole increases.*

39. *Tthe method of claim 35 wherein the density of the treatment fluid in the borehole is sufficient to prevent kicks without fracturing a region of the subterranean formation adjacent to the borehole.*

40. *The method of claim 35 wherein the subterranean formation is located beneath the ocean floor.*

41. *The method of claim 35 wherein the density of the treatment fluid decreases as the treatment fluid travels from the ocean floor to sea level.*

42. *The method of claim 35 wherein the variable pressure weighting material particle comprises a material selected from the group consisting of: a plastic, an elastomer, and a metal.*

43. A method comprising:

providing a treatment fluid having a density that varies as a function of pressure when placed in a subterranean formation, wherein the treatment fluid comprises a base fluid and at least a plurality of variable pressure weighting material particles; and placing the treatment fluid in a subterranean formation via a borehole as part of a subterranean operation selected from the group consisting of: a sitmulation operation, a completion operation, a fracturing operation, an acidizing operation; a well cleanup operation, a workover operation, and a gravel packing operation;

wherein the variable pressure weighting material particles are present in the treatment fluid in an amount in the range of from about 0.01% to about 40% by volume of the treatment fluid.

44. The method of claim 43 further comprising the step of producing a fluid from the subterranean formation.

45. The method of claim 43 wherein a portion of the variable pressure weighting material particles can withstand temperatures up to about 500° F. without degrading.

46. The method of claim 43 wherein the density of the treatment fluid increases as the pressure in the bore hole increases.

47. The method of claim 43 wherein the density of the treatment fluid in the borehole is sufficient to prevent kicks without fracturing a region of the subterranean formation adjacent to the borehole.

48. The method of claim 43 wherein the subterranean formation is located beneath the ocean floor.

49. The method of claim 43 wherein the density of the treatment fluid decreases as the treatment fluid travels from the ocean floor to sea level.

50. The method of claim 43 wherein the variable pressure weighting material particle comprises a material selected from the group consisting of: a plastic, an elastomer, and a metal.

* * * * *